March 7, 1961 R. I. EWING 2,973,654
DRUM PULLEY
Original Filed Sept. 12, 1952

R. INEZ EWING
INVENTOR.
BY David H. Bobis
Atty

2,973,654
Patented Mar. 7, 1961

2,973,654

DRUM PULLEY

R. Inez Ewing, Snyder, N.Y., assignor to Worthington Corporation, Harrison, N.J., a corporation of Delaware Continuation of application Ser. No. 309,270, Sept. 12, 1952. This application Feb. 10, 1956, Ser. No. 564,752

2 Claims. (Cl. 74—230.01)

The present invention relates to pulleys and more particularly to drum pulleys which carry an endless belt on which is disposed material to be conveyed or transported from one point to another.

The present invention is a continuation of my co-pending application Serial No. 309,270, filed September 12, 1952, and now abandoned.

In accordance with the present invention, a wide faced pulley commonly known as a drum or conveyor pulley is provided having adjustable and detachable clamping means disposed thereon for clamping the pulley on shafts of various diameters.

An object of the present invention is to permit the use of a drum pulley which carries an endless conveyor belt to be fitted to oversize and undersize shafts without having the pulley clamping hubs bored to the particular diameter of the shaft on which the pulley is to be fixed. The difficulty with fitting these pulleys on oversize or undersize shafts when the clamping hubs disposed on them are rigidly fixed to the pulley side walls is that these side walls are rather thin sections in comparison with the width or drum portion of the pulley and hence cause the side walls to either dish or expand when clamping the pulley hubs to the shaft.

In the present invention, the drum pulley is provided with adjustable clamping hubs detachably connected to the outer surfaces of the pulley side walls and with collar means detachably connected to the clamping hubs. This permits the clamping hubs to be loosely connected to the pulley side walls and the pulley and hubs to be positioned on a shaft without putting any strain on the thin sectioned side walls. Thereafter, the adjustable clamping hubs are rigidly fixed or clamped to the shaft by the collars. Then, the hubs are tightly connected to the pulley side walls and the pulley is ready to carry a conveyor belt. Thus, this arrangement permits the drum pulley to be fastened to oversize and undersize shaft diameters without dishing or expanding the pulley side walls or causing failure thereof.

The invention will be better understood from the following description when considered in connection with the accompanying drawing forming a part thereof and in which.

Figure 1:
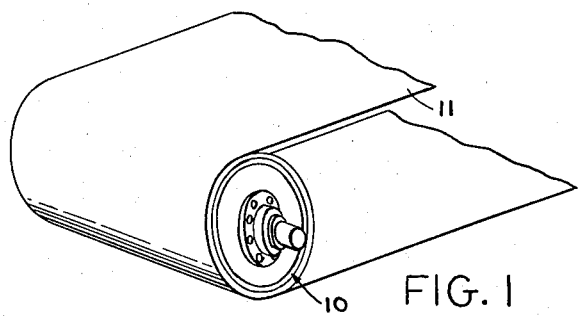
Figure 1 is a perspective view showing the drum pulley of the present invention with a conveyor belt mounted thereon.
Figure 2:
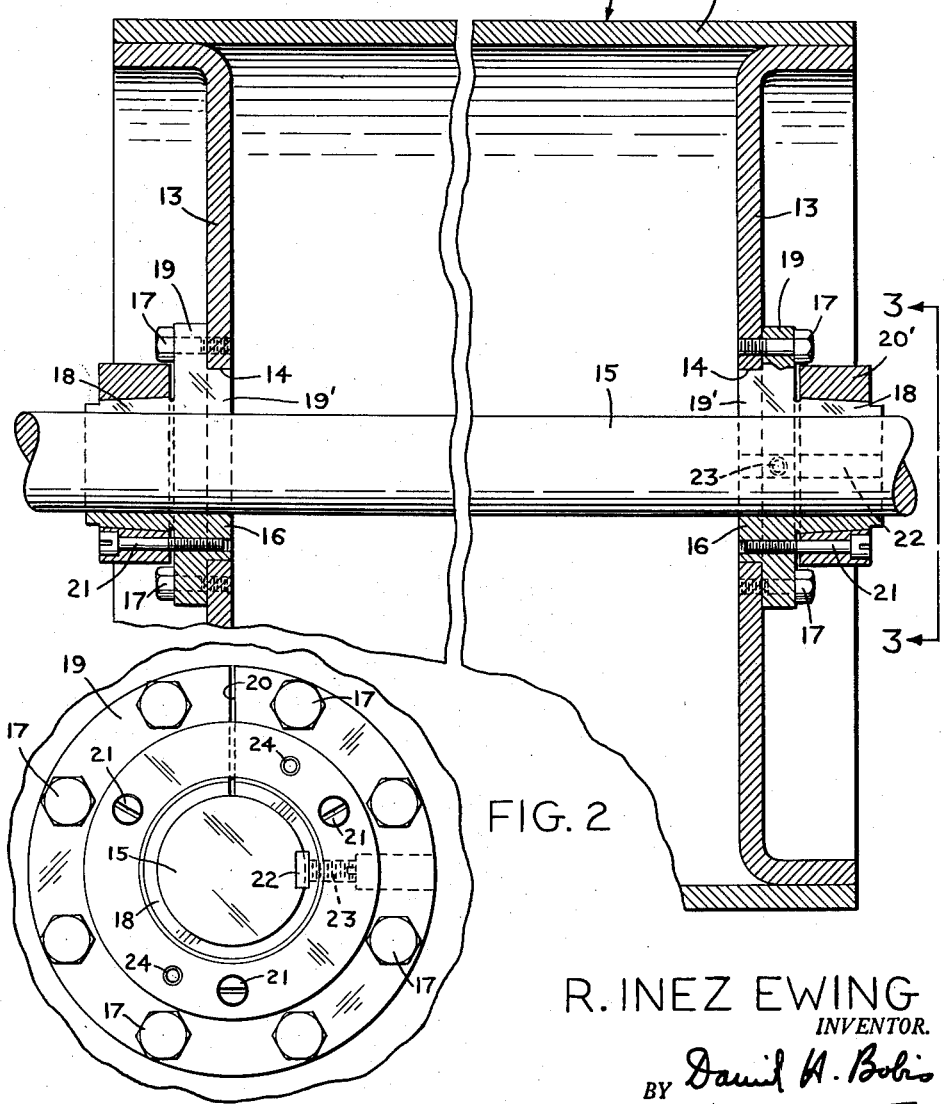
Figure 2 is a fragmentary side elevation, in section, of the drum pulley of the present invention.

Referring to the drawings, the reference numeral 10 designates a drum pulley on which is mounted a portion of an endless conveyor belt 11 commonly used to convey or transport material thereon. Drum pulley 10 comprises a substantially cylindrical sleeve or drum portion 12 to the opposite ends of which are fixed, by any suitable means, relatively thin sectioned discs 13 which form the side walls or end walls of the pulley. Discs 13 are provided with central or axial openings 14 therein through which extends a shaft 15 on which the pulley is mounted. Clamping hubs 16 are detachably connected adjacent the outer surface of each disc 13 by a plurality of circumferentially spaced threaded bolt members 17 threaded into the discs. Hubs 16 comprise a sleeve portion 18 having a tapered outer surface and a flange portion 19 which abuts a disc and through which the bolt members 17 extend. Flange 19 also has an inner flange portion 19' of smaller diameter which extends through the opening 14 in the abutting disc 13 and on which disc 13 rest for the support of the pulley and for ease in centering and mounting the pulley. A radially extending slot 20 extends entirely through the sleeve and flange portion of the hub so that the internal diameter of the hub is adjustable and the pulley may be mounted on oversize and undersize shafts. A collar 20' is disposed on the sleeve portion 18 of the hub and has its inner surface tapered in the same direction as the tapered surface of the sleeve 18. Collar 20' is detachably connected to the hub by a plurality of circumferentially spaced threaded bolt members 21 which extend through the collar and are threaded into the flange portion 19 of the hub.

Figure 3:
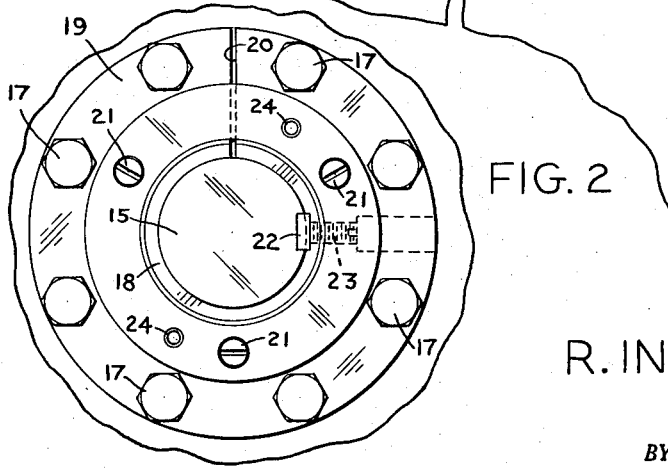
Figure 3 is an enlarged end view taken on line 3—3 of Figure 2 of the drum pulley.

A keyway is provided in shaft 15 and the inner surface of the hub 16 to receive a key 22 therein for locking the pulley structure to the shaft for rotation therewith after the pulley has been mounted on the shaft, as hereinafter described. A set screw 23 is provided in hub flange portion 19 to prevent axial movement of the key. Jack bolt holes 24 (see Fig. 3) are provided in the collar 20' for backing off the collar from the hub.

In operation, when it is desired to mount the drum pulley on a shaft the clamping hubs 16 are first loosely connected by threaded members 17 to pulley discs 13 and the hubs and pulley are then properly positioned on the shaft 16. Thereafter, the collars 20' are moved axially of hub sleeve portions 18 by drawing up or tightening threaded bolt members 21 until the split hubs are rigidly secured or clamped to the shaft by the pressure of the collars against the outer surface of the hubs. Thereafter, the threaded bolt members 17 are drawn up or tightened until the drum pulley side walls are tightly connected to the hub flanges. Key 22 is then positioned in the keyway and set screw 23 tightened to cause rotation of the drum pulley with the shaft when the shaft is rotated or driven by means not shown.

Thus, the present invention provides a conveyor pulley which may be fixed to oversize and undersize shafts without the danger of dishing or expanding the thin sectioned pulley side walls or of causing failure thereof when the drum pulley is mounted on various sized shafts.

It will be understood that the invention is not to be limited to the specific construction or arrangement of parts shown but that they may be widely modified within the invention defined by the claims.

What is claimed is:

1. In a pulley assembly, a cylindrical sleeve provided at each end with a radially inwardly extending disc, means firmly securing one of said discs to a shaft and means demountably coupling the other disc to the shaft without creating excessive stresses in either of the discs, the last named means comprising a circular opening in said other disc to receive a hub, a split hub having an axial bore for receiving the shaft, said hub having an annular flange adjacent one end abutting said other disc and a tapered peripheral surface converging inwardly from one face of the flange toward the other end of the hub, a peripheral shoulder on said hub adjacent the other face of said flange fitting within said circular opening, a collar mounted on said hub having an inner tapered bore conforming with the outer taper on said hub, the flange on said hub having an inner and an outer circle of circumferentially spaced openings, said collar having openings aligned with said inner circle of circumferentially spaced openings, said disc having openings aligned with said outer circle of circumferentially spaced openings in said flange, tensioning means extending through the inner circle of circumferentially spaced openings to draw the collar axially toward the disc to contract the hub radially into clamping relation with the shaft, and other tensioning means extending through the outer circle of circumferentially spaced openings to connect the hub and disc.

2. The pulley assembly according to claim 1 including a key, said shaft defining a keyway, said hub defining a recess, said key connected between said keyway and said recess to engage both said shaft and said hub, said hub defining a screw hole communicating said recess with the exterior of said hub at the periphery of said annular flange, a set screw connected in said screw hole to contact said key for restraining said key from axial movement relative said shaft.

References Cited in the file of this patent

UNITED STATES PATENTS

| | | |
|---|---|---|
| 960,010 | Goldman | May 31, 1910 |
| 1,371,212 | Adams et al. | Mar. 15, 1921 |
| 1,371,666 | Close et al. | Mar. 15, 1921 |
| 1,766,585 | Banfield et al. | June 24, 1930 |
| 2,418,396 | Carr et al. | Apr. 1, 1947 |
| 2,524,903 | Firth | Oct. 10, 1950 |
| 2,669,471 | Breslow | Feb. 16, 1954 |
| 2,749,157 | Dennison | June 5, 1956 |